United States Patent [19]
Dominique

[11] Patent Number: 5,982,533
[45] Date of Patent: Nov. 9, 1999

[54] MICROSCOPE WITH ENDPLATE FOR VIEWING SURFACE END OF FIBER OPTIC CABLE

[76] Inventor: Jeffrey M. Dominique, P.O. Box 51291, Phoenix, Ariz. 85076-1291

[ * ] Notice: This patent is subject to a terminal disclaimer.

[21] Appl. No.: 09/028,994

[22] Filed: Feb. 25, 1998

Related U.S. Application Data

[63] Continuation-in-part of application No. 08/604,654, Feb. 21, 1996, Pat. No. 5,731,893.

[51] Int. Cl.$^6$ .................................................... G02B 21/06
[52] U.S. Cl. ........................... 359/379; 359/387; 359/385; 359/394; 359/801
[58] Field of Search ..................................... 359/309, 365, 359/387, 394, 801

[56] References Cited

U.S. PATENT DOCUMENTS 4,505,556  3/1985  Bridson et al. ......................... 350/352
4,595,265  6/1986  Hodgson et al. ....................... 350/523
5,731,893  3/1998  Dominique .............................. 359/379

Primary Examiner—Cassandra Spyrou
Assistant Examiner—Jared Treas
Attorney, Agent, or Firm—Steven J. Funk

[57] ABSTRACT

The portable microscope includes an end plate for improved inspection of the end surface of a fiber optic cable at a connection point in a fiber optic system. The end plate is mounted on the head unit housing of the microscope and includes a tubular aperture for receiving and positioning the end of the fiber optic cable for microscopic inspection. A reflection bowl is formed about the tubular aperture on the inner surface of the plate to direct more light to the end of the fiber optic cable. The tubular aperture may be formed in an adapter and the adapter may be secured in a threaded aperture of the end plate. A rocker head adapter may be used to provide both direct and angled viewing of the end surface of a glass fiber. Spacer blocks with reflective surfaces are used to position the end plate on the microscope and to direct more light towards the end surface of the fiber optic cable.

18 Claims, 6 Drawing Sheets

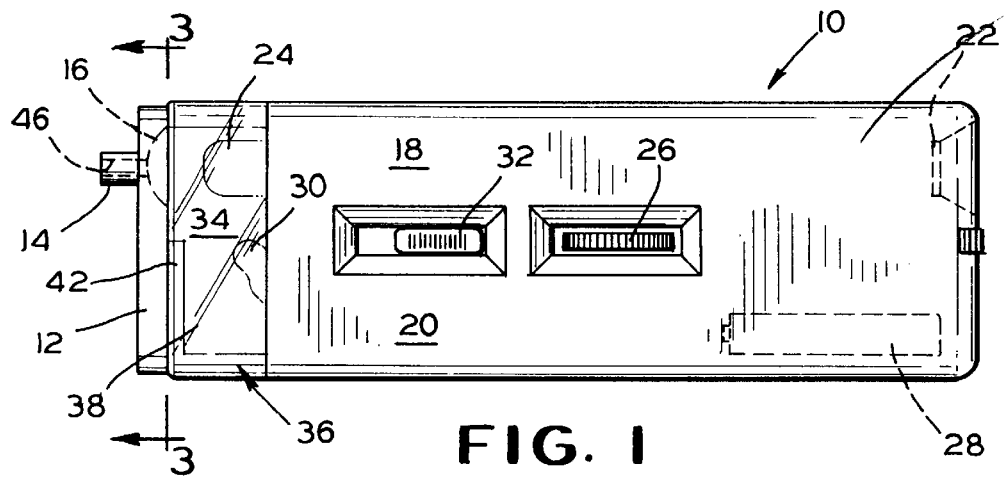
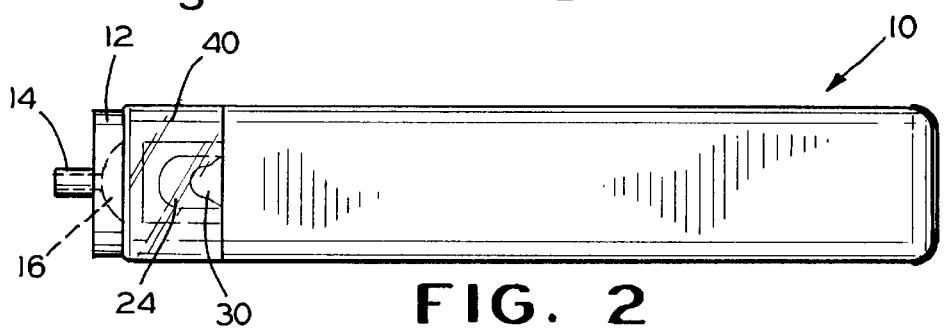
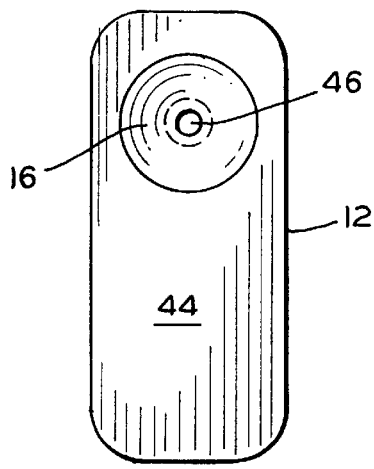
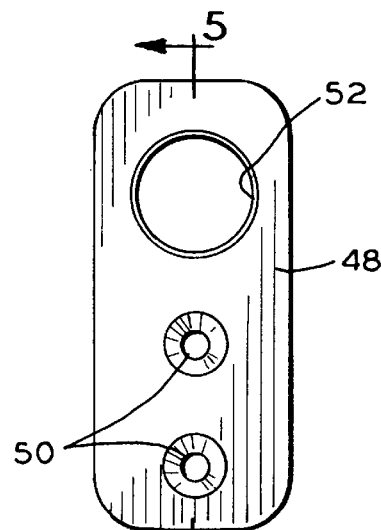
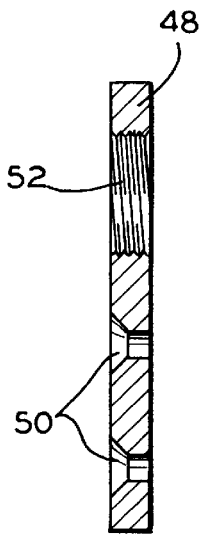
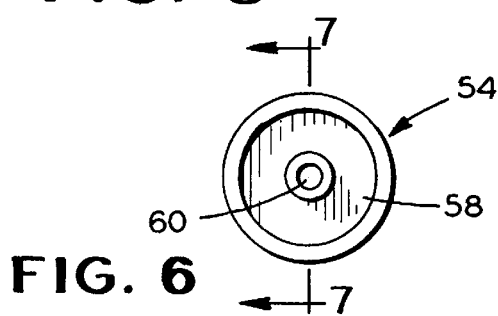
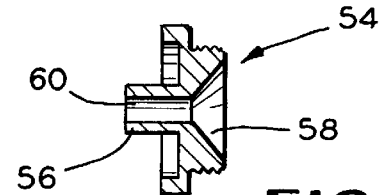

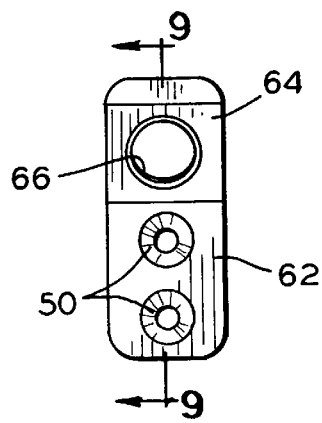 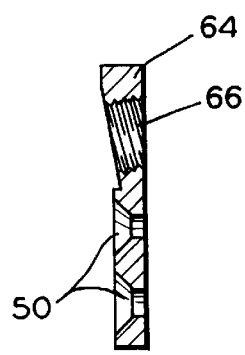 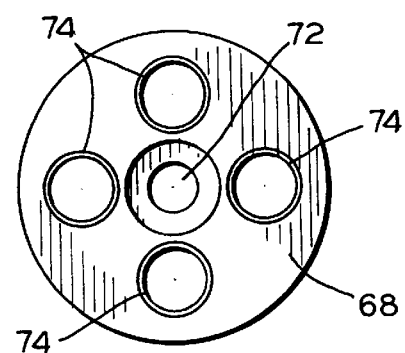
FIG. 8   FIG. 9   FIG. 10
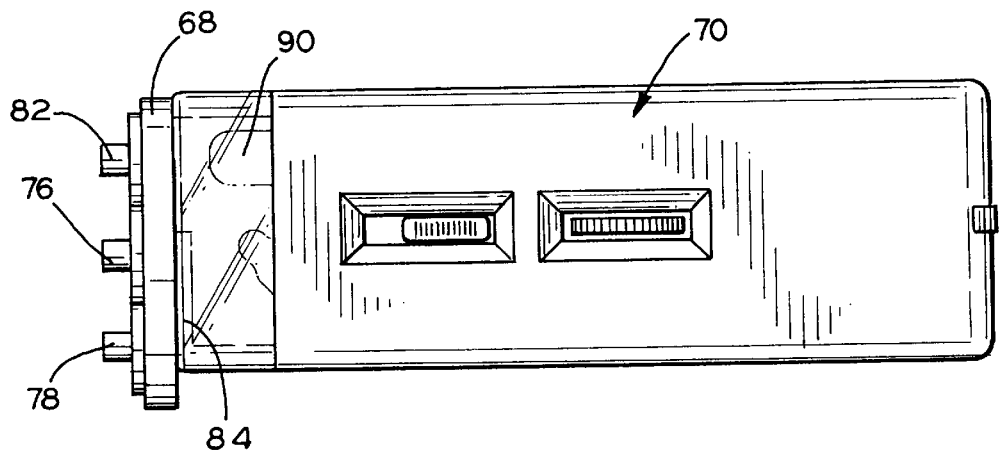
FIG. 11
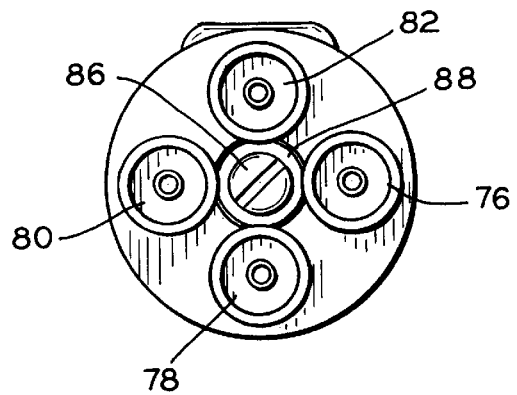
FIG. 12

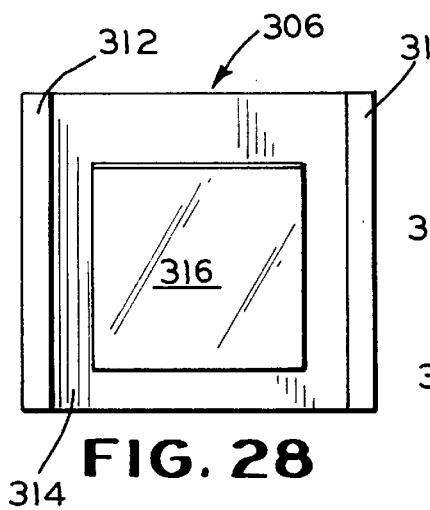
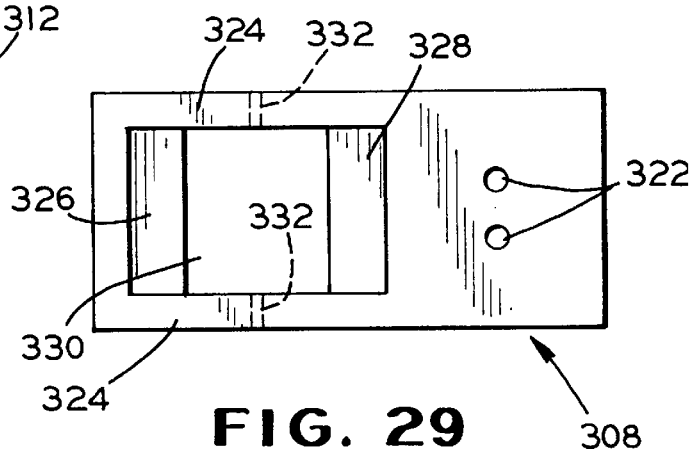
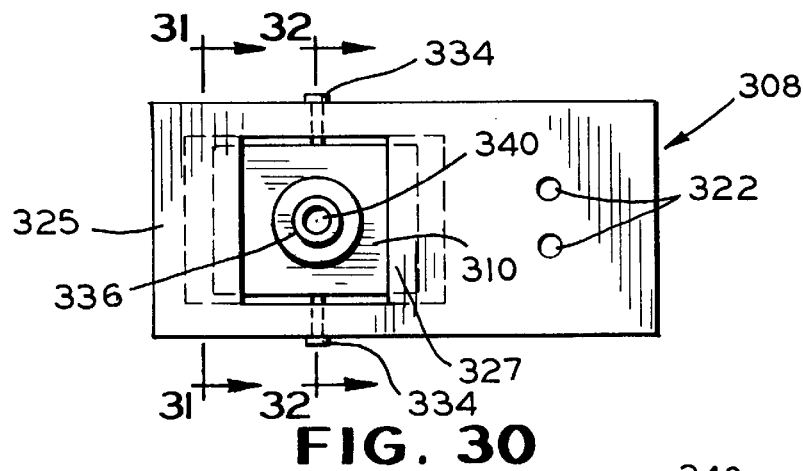
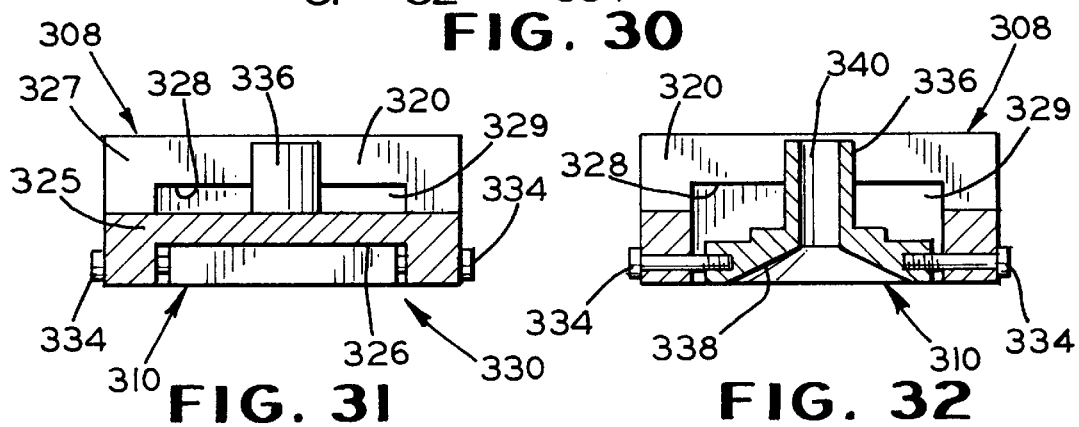
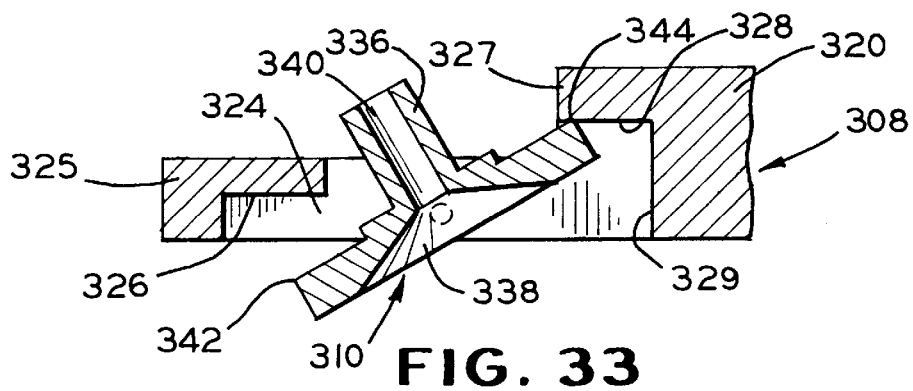

MICROSCOPE WITH ENDPLATE FOR VIEWING SURFACE END OF FIBER OPTIC CABLE

This application is a continuation-in-part application and is related to U.S. patent application Ser. No. 08/604,654 which is now U.S. Pat. No. 5,731,893 filed Feb. 21, 1996.

BACKGROUND OF THE INVENTION

Field of the Invention. The present invention relates to a portable microscope for use in inspecting fiber optic connections, and more particularly, to a portable microscope with a battery powered light source. The portable microscope is provided with a metal end plate with a highly reflective bowl to increase the intensity of the light for improving the view of the fiber optic cable secured in a connector. The end plate may also be provided with adapters to accommodate different sizes of ferrules used in the fiber optic connectors. Rocker heads may be attached to the end plate to facilitate the viewing the end of fiber optic cables at different viewing angles.

Summary of Related Art. Fiber optic technology is the transmission of energy by light through glass fibers, and is used to transmit and receive analog and digital signals. Fiber optic technology is now being woven into the network of telephones, televisions, computers, and data banks that form the information super highway. Fiber optic cable is the premier medium to meet the demand for higher speeds and greater information carrying capacity. Telephone, cable television, communication companies, and other businesses around the world are investing billions of dollars in fiber optic lines which have an enormous capacity for carrying data.

Fiber optic systems can be used to replace and enhance electronic or electrical systems in a number of applications, including process control systems, security systems, cable television, high speed switching circuits, motor control circuits, video links and various LAN networks. Because of the advantages of fiber optic systems over conventional electrical and electronic components and systems, significant growth and expansion is anticipated in the use of fiber optic systems.

One of the main advantages of the fiber optic system is the ultra clear and clean signals in such system. Fiber optic systems are non-conductive, and are not effected by interference from radio frequency or electromagnetic fields. A fiber optic system can be routed through high voltage areas and radio-microwave communications systems without any noise shielding. A fiber optic system poses no electrical hazard potential, and can be used in explosive or fire hazard areas. A fiber optic system has a much greater range of temperature stability and is less susceptible to the adverse affects of moisture.

The losses associated with the transmission of fiber optic signals are significantly less than the losses in an electrical system. The fiber optic signals travel greater distances without amplification. An amplified fiber optic signal is preferred over conventional cable signals because the fiber optic system has little or no induced noise in the amplified signal.

Another major benefit of a fiber optic system is the greater information carrying capacity. The fiber optic cable is significantly smaller and lighter in weight than the comparable copper conductors required for equivalent transmission capabilities. Coaxial cable used for cable television application can carry approximately 10 million bits of data per second. Comparable fiber optic cables, in contrast, can carry data at more than 10 gigabits (10 trillion bits) per second. Optical data is transmitted through fiber optic cable at speeds up to 100 times faster than data transmitted using copper wire.

A typical fiber optic system consists of a transmitter, a transmission medium, and a receiver. The transmitter receives an analog or digital electrical input signal and includes a source driver and light source to generate and transmit a light signal. The source driver receives the electrical input signals and generates control signals to control the light source. The typical light sources are lasers or light emitting diodes. The light from the light source is transmitted through the transmission medium to the receiver. The receiver is an optical detector which converts the light signal back into the same form of electrical signal as the original input.

The transmission medium is a fiber optic cable which includes a core made from extremely pure glass drawn out into a fine strand that is strong and flexible. The fiber optic cable also requires an outer sheath or cladding formed around the highly transparent core of glass that carries the light. The cladding reflects light back into the core such that the light is propagated by internal refraction. Fiber optic cable is classified by transmission type (single mode, graded index multimode, etc.) and by core/cladding diameter (i.e. 62.5/125 microns).

The single mode fiber only propagates one mode of light which makes it highly efficient. This type of cable is used with laser sources and requires an exact coupling alignment to a well-defined beam of light. The graded index multimode fiber exhibits a variable core density cross-section, which reduces intermodal dispersion and acts to focus broader bandwidths of reflected light into the fiber's core. Precision alignment of splices and connections are also essential in the graded index multimode fiber.

A single mode cable consists of a single glass fiber core surrounded by a layer of cladding, a buffer, a strength member, and an outer protective covering. The cladding is formed by doping one or more layers of glass. The cladding has a lower index of refraction than the glass which causes a light wave to be directed by towards the core of the fiber optic cable. In a multiple mode configuration, the core is made up of multiple layers of glass. Each layer is doped to exhibit a slightly lower index of refraction than the previous layer.

The buffer adds strength and stability to the fiber and may be made from a variety of materials, such as polyvinyl. The strength member protects the fiber during installation and use, and is made from a strong, flexible material. The outer cover is typically made from plastic and protects the core of the cable from ambient conditions.

The single mode and/or multiple mode fibers can be assembled into multi-fiber bundles with a single outer cover. The bundles may include a central strength member for additional strength during installation. The bundle is designed to facilitate the splitting out of individual fibers for connection purposes.

The core size may be as small as 10 microns in diameter for a single mode fiber and as large as 85 microns for a multiple mode fiber. When the cladding is included, the total diameter for a single mode fiber can range up to 125 microns. The single mode fiber is very efficient at transmitting light, but such fiber has a small numerical aperture and is not effective in gathering light. Consequently, the single mode fiber is generally used for long distance applications with laser light transmitters, which can provide a concentrated beam of light. The multiple mode fiber has a much larger numerical aperture, but is less efficient at transmitting the light. The multiple mode fibers are used with light emitting diodes for with a broader light wave for more local applications (50 miles or less). The diameter for multi mode fibers ranges from 125 microns to 400 microns.

Attenuation is the loss of power that a light pulse experiences from the source to the receiver. The attenuation in a fiber optic system is measured in decibels. Attenuation may be caused by dispersion, fiber defects, improper installation and maintenance, and other similar factors.

In fiber optic systems, designer engineers and technicians perform power budget calculations to determine original and periodic operational system integrity in regard to attenuation. The transmitter spectral output power and receiver maximum sensing range are compared to the system losses in the fiber, connectors, spices, and couplers. The transmitter and receiver must be sized to ensure power to propagate the signal from the source to the receiver.

The total attenuation is significantly affected by the quality of the connections and/or splices in the fiber optic system. The losses at a dirty or poor quality connection can easily increase losses in the fiber optic system by as much as ten times the projected amount for a high quality connection. Poor quality connections are the most frequent cause of power loss, which results in operating defects and breakdowns in the fiber optic system.

Each fiber optic system will have optical connections at each junction between a fiber optic cable and a light source or detector. Connections are also needed to join or splice together the ends of two cables. Since each fiber optic system will include a number of junctions of fiber optic cable, it is essential that the technicians working on fiber optic cables in the field use a microscope and other tools to properly connect the fiber optic cables.

In the installation of a fiber optic system, transmitters and receivers may be positioned throughout the system at the desired locations for transmitting and receiving signals. The transmitters and receivers are mounted in a light interface unit which includes both electrical receptacles for input/output of electrical signals and lighting receptacles for the input/output of light signals. After the light interface units with transmitters and receivers have been installed and the cable between the light interface units pulled, one of the final field steps to complete the installation is connectorization, which is the connection of fiber optic connectors to the ends of the fiber optic cables to facilitate the proper alignment of the core of the fiber optic cable at the fiber optic connections.

In a fiber optic system, a receptacle is a termination device for a fiber optic connection. The receptacle has two ports aligned with a center aperture to promote proper alignment of the fiber optic cable cores at the point of connection. In a light interface unit, the receptacle is mounted in a fixed position with one port connected to a transmitter or receiver and the second port aligned for the insertion of a connector on the end of the fiber optic cable. Receptacles are also used outside of the light interface units to splice together two fiber optic cables.

The fiber optic cables used in a system will have a connector secured to each end of the fiber optic cable, the connector being designed for insertion and locking in the receptacle. The cable is stored on spools and is pulled from the spools in the field during installation. Several different types of receptacles and connectors are available for use in fiber optic systems.

The connectors are typically installed on the fiber optic cable in the field at the time of installation. The fiber optic cable is stripped of its protective covering and the glass core and cladding are inserted into the connector such that the glass core extends from the ferrule at the end of the connector. The cable is epoxied into the connector and the glass core at the end of the ferrule is cleaved and polished using a lapping process.

The polished end of the core of the cable must be inspected to ensure that the end surface is clean and scratch free. Any scratches or cracks in the end of the glass fiber will adversely effect the integrity of the connection. Even body oils, lint or dust can cause unacceptable losses at the connection.

Because the glass core of a fiber optic cable is so small and because a good connection is essential to the overall efficiency of the system, a portable microscope for use in connecting the connectors to the fiber optic cable is an essential tool for the technician. The technician in the field must be able to inspect the end of the core of the fiber optic cable to ensure a smooth and clean surface for transmission of the light.

As the application of fiber optic systems for business and personal use has increased, the demand for technicians to install and service the systems has not kept pace. In addition, there is a critical need for tools and supplies which are suited for use by technicians in the installation and servicing of the fiber optic systems.

One of the problems with existing portable microscopes is providing sufficient lighting directed to the core of the fiber optic cable when positioned at the end of the microscope. The light source on a portable microscope is not very powerful and cannot be positioned in the most desirable position.

Another problems with existing portable microscopes is the dark plastic heads used to position the end of the fiber optic cable. The heads have a tendency to break or crack during use in the field. The dark surface of the plastic head tends to absorb light and adversely impact the ability of the technician to inspect the end of the fiber optic cable.

SUMMARY OF THE INVENTION

In accordance with the present invention, there is provided a portable microscope with a reflective end plate for improved inspection of the end surface of a fiber optic cable at a connection point in a fiber optic system. The hand held microscope used for field inspection of fiber optic surfaces at connection points typically includes 100× magnification capabilities and a battery powered light source. Hand held microscopes with 200× and greater magnification are also available for field use.

The end plate of the hand held microscope of the resent invention is mounted on the head unit housing of the microscope and includes a tubular aperture for receiving and positioning a ferrule with the end of the fiber optic cable for microscopic inspection. A reflection bowl is formed about the tubular aperture on the inner surface of the plate to direct more light to the end of the fiber optic cable. The outer surface of the plate includes a positioning tube for receiving the end of the fiber optic cable and directing the cable through the aperture into the reflection bowl.

In a first embodiment of the plate, the positioning tube and reflection bowl are integrally formed in the plate. The plate is detachable from the end of the portable microscope such that the technician may utilize a series of plates with different size apertures to accommodate the different sizes ferrules used in the connectors to secure the end of fiber optic cable. The positioning of the end of the fiber optic cable is an important part of the inspection process such that the aperture must be sized in accordance with the size (diameter) of the ferrules in the connectors.

In an alternative embodiment, the plate is provided with an oversized aperture for securing different adapters in the aperture of the plate. The adapters include a center aperture for the ferrule and cable, a positioning tube, and a reflection bowl. The adapters are built to accommodate different size ferrules, and the technician can easily change the adapters to required size for the ferrules used in the connectors. The most standard ferrule diameters are 2.5 mm, 2.0 mm, and 3.0 mm.

A circular plate may also be rotatably mounted to the end of the portable microscope. The circular plate is designed to hold up to four adapters. The technician may change adapters for use in inspection under the microscope by rotating the circular head such that the desired adapter is positioned for insertion of the end of the fiber optic cable. The technician may use the same size adapters in the circular head to facilitate rapid inspection of multiple connectors.

The present invention also includes an end plate with a rocker head mounted on the end plate. The rocker head includes a positioning tube and a reflection bowl formed in the rocker head. Once the end of the fiber optic cable is inserted into the positioning tube (ferrule channel) to extend into the reflection bowl, the rocker head can be pivoted about the end plate to position the end of the fiber optic cable for both a direct view and an angle view of the cable end.

With larger hand held microscopes, such as the 200× magnification scope, alternative end plate configurations may be needed to facilitate the additional lighting required for the proper illumination of the end of the fiber optic cable. A U-block configuration of the present invention provides a reflective surface mounted adjacent the light source on the microscope. The end plate includes a rocker head with an integral reflective bowl for viewing the end of a fiber optic cable at different viewing angles.

In order to secure the end of the fiber optic cable when the cable is positioned in the ferrule channel, an insert can be positioned in the channel. The insert is made from tygon or other similar material to provide a soft and protective surface to engage the connector ferrules of the fiber optic cable.

An object of the present invention is to provide a portable microscope with improved fiber optic cable inspection capabilities. A reflective plate increases the amount of light for viewing the end of the cable. The reflection bowl directs additional light towards the end of the cable.

Another object of the present invention is to provide a simple and accurate means for positioning the end of the fiber optic cable. The positioning tube assists the technician in directing the end of the fiber optic cable to the proper location at the end of the microscope.

A further object of the present invention is to provide adapters with different sized positioning tubes and reflection bowls which can be selectively mounted in the plate to accommodate different sized ferrules for the fiber optic connectors.

An additional object of the present invention is to mount a rocker head on the end plate such the end of the fiber optic cable can easily be viewed at different angles by simply pivoting the rocker head. Reflective surfaces can also be used on the end plate to increase the amount of light directed towards the end of the fiber optic cable.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a top plan view of a portable microscope including an end plate with a reflection bowl;

FIG. 2 is a side elevational view of the portable microscope with end plate;

FIG. 3 is a view of the inner surface of the end plate with reflection bowl taken along lines 3—3 in FIG. 1;

FIG. 4 is a top plan view of an end plate with an aperture for mounting an adapter with a positioning tube and reflection bowl;

FIG. 5 is a cross-sectional view of the end plate taken along lines 5—5 in FIG. 4;

FIG. 6 is a top plan view of an adapter for mounting in the end plate shown in FIG. 4;

FIG. 7 is a cross-sectional view of the adapter taken along lines 7—7 in FIG. 6;

FIG. 8 is a top plan view of and end plate with an aperture for mounting an adapter at an angle;

FIG. 9 is a cross-sectional view of the end plate taken along lines 9—9 in FIG. 8;

FIG. 10 is a circular end plate with a plurality of apertures for mounting a plurality of adapters in a single end plate;

FIG. 11 is a top plan view of a portable microscope with the circular end plate shown in FIG. 10;

FIG. 12 is an end view of the microscope with the circular end plate;

FIG. 28 is a front elevational view of the base of the U-shaped head shown in FIG. 27;

FIG. 29 is a bottom plan view of the end plate for the U-shaped head shown in FIG. 27;

FIG. 30 is a top plan view of the end plate and rocker head of the U-shaped head shown in FIG. 27;

FIG. 31 is a cross-sectional view of the end plate and rocker head taken along lines 31—31 in FIG. 30;

FIG. 32 is a cross-sectional view of the end plate and rocker head taken along lines 32—32 in FIG. 30; and FIG. 33 is a partial, cross sectional view of the end plate and rocker head shown in FIG. 27 with the rocker head pivoted to an angled position for viewing the end surface of a glass fiber at an angle.

DESCRIPTION OF THE PREFERRED EMBODIMENT

Figure 13:
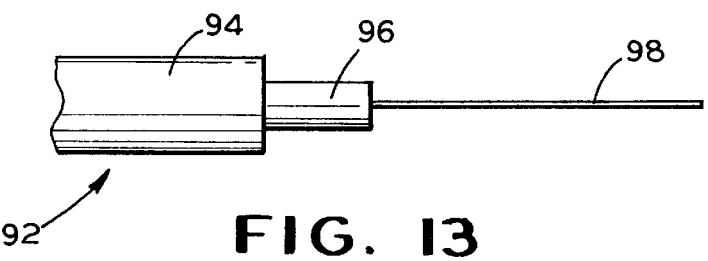
FIG. 13 is an enlarged view of a fiber optic cable which has the protective cover stripped away for insertion of the glass fiber into a connector.

Referring now to FIGS. 1–2, there is shown a portable microscope 10 with an end plate 12 secured to the end of the microscope 10. As hereinafter described, the microscope 10 is used to inspect the end surface of a glass fiber. In a fiber optic junction, the glass fiber is secured in a ferrule of the fiber optic connector such that the end surface of the glass fiber is exposed for transmission of a light signal to a glass fiber in an adjacent connector. When installing or repairing a fiber optic system, the technician must inspect the end of the glass fiber after it has been secured in the connector. The inspection is accomplished by insertion of the ferrule of the connector through a positioning tube 14 such that the end of the glass fiber is located in the center of the reflection bowl 16 of the end plate 12 for viewing through the microscope 10.

The portable microscope 10 has two longitudinal, internal compartments, a first compartment 18 for the magnifying components of the microscope and a second compartment 20 for the battery powered light source. The magnifying components include a viewing lens 22 at one end of the microscope 10 and an adjustable focus lens 24 at the other end of the microscope 10. The position of the adjustable focus lens 24 is adjusted by turning positioning knob 26 in the body of the microscope 10.

The light source in compartment 20 includes batteries 28 to power light bulb 30 which is positioned at an angle to direct the light in the desired direction. An on-off switch 32 is conveniently located on the microscope 10.

A viewing chamber 34 is formed at the cable end of the microscope 10 by a head unit housing 36 having side walls 38, end walls 40, and a partial top 42. The housing is typically made from a clear plastic material, but any rigid, lightweight material could be used to form the housing. The housing is permanently affixed to the end of the microscope 10.

The end plate 12 is affixed to the partial top 42 of the head unit housing 36. The end plate 12 may be glued to the top 42 or secured by two set screws extending through the end plate 12 into the top 42. The inner surface 44 of the end plate 12 includes the reflection bowl 16 with a center aperture 46 which extends through the positioning tube 14. The reflection bowl is formed with a polished, highly reflective surface in order to direct the maximum amount of light towards the end of the glass fiber which is positioned in the bowl 16. The end plate may be made from aluminum, stainless steel, or other reflective metal surface. The bowl 16 also could be formed of other material which includes a reflective coating formed on the inner surface 44 of the end plate 12 and bowl 16.

FIGS. 4–7 show an alternative end plate 48 with additional features. The end plate 48 includes to apertures 50 for insertion of flat head screws to secure the plate 48 to the top 42 of the head unit housing 36. Instead of having the reflective bowl integrally formed in the end plate 48, the end plate 48 is provided with a threaded aperture 52. An annular adapter 54 with a threaded outer surface is screwed into the aperture 52. The adapter 54 includes a positioning tube 56 and reflective bowl 58 with center aperture 60. The technician can be provided with a plurality of adapters with different-sized apertures, which permits the technician to inspect glass fibers in connectors with different ferrule sizes by unscrewing one adapter and inserting a second adapter with a different aperture.

In checking the end surface of a fiber optic cable for cracks, scratches, and/or contaminants, it may be beneficial to view the end surface at a slight angle instead of directly viewing the end surface (lens aligned with the cable perpendicular to the end surface). FIGS. 8–9 show an end plate 62 with an increased thickness at the adapter end 64 of the plate 62. The increased thickness permits the threaded aperture 66 to be formed at a slight angle. The preferred angle is in the range of 5–20 degrees from the horizontal surface of the plate 62. The annular adapters 54 are screwed into the aperture 66 such that the positioning tube 56 and bowl 58 are aligned at an angle with respect to the adjustable focus lens 24.

The end plates 48 and 62 include only a single threaded aperture to secure a single adapter. Any additional adapters to be used by the technician when inspecting fiber optic cables must be carried separately. An alternative end plate configuration is shown in FIGS. 10–12. The end plate 68 of microscope 70 is a circular head with a center mounting aperture 72 and four threaded apertures 74 for retaining four adapters 76, 78, 80, 82.

The circular end plate 68 is secured to the head unit housing 84 by a screw 86 with a retaining hub 88 and Belleville washer or other similar fastening means. The screw 86 is tightened to secure the plate, and the retaining hub 88 and spring type Belleville washer facilitate the rotation of the plate 68 until the desired adapter is aligned with the adjustable focus lens 90. The threaded adapters 76, 78, 80, 82 may include different sized apertures to accommodate different style connectors. In some cases, a technician may want to inspect four connectors of the same size such that the four adapters have the same size aperture.

The portable microscopes 10, 70 of the present invention are used by technicians to inspect the end surface of the core of a fiber optic cable during the installation or servicing of a fiber optic system. When forming a junction of a fiber optic cable to a transmitter, a receiver, or another fiber optic cable, a connector is secured to the end of the fiber optic cable for mounting in a receptacle to complete the junction. As noted above, any cracks, scratches, dust, lint, oil, or other contaminants can significantly and adversely effect the integrity of the junction. A technician completing fiber optic junctions in the field will a portable microscope when securing connectors to fiber optic cables.

FIG. 13 shows an end of a fiber optic cable 92 which has been prepared for the installation of a connector. Special tools have been developed to strip away the outer jacket 94, the strength member 96 and the buffer until only the glass fiber 98 is exposed. The glass fiber 98 includes the center transmission core and the cladding layer of doped glass. The cross sectional diameter of the glass fiber 98 is generally in the range between 50 microns and 400 microns.

Figure 14:
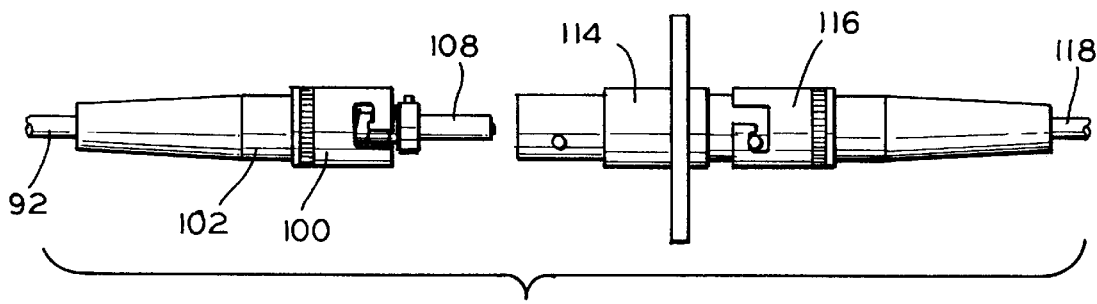
FIG. 14 shows a receptacle with a first connector mounted in the receptacle and a second connector positioned adjacent the receptacle prior to insertion into the receptacle to complete the fiber optic connection.
Figure 15:
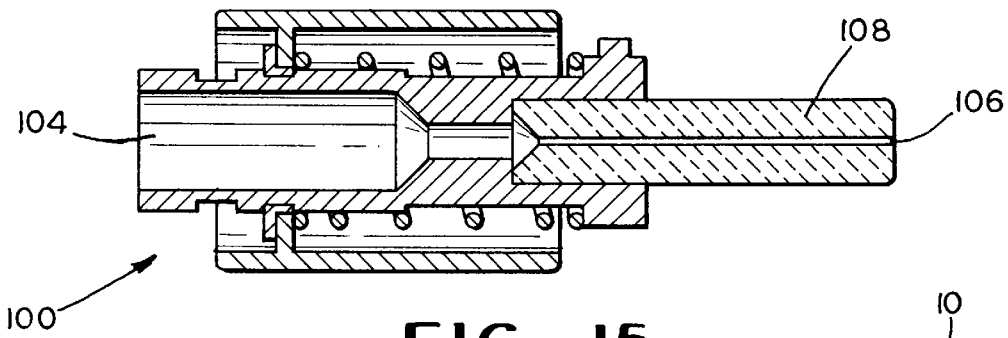
FIG. 15 is an enlarged, cross-sectional view of a connector showing the ferrule and capillary hole for positioning the glass fiber.
Figure 16:
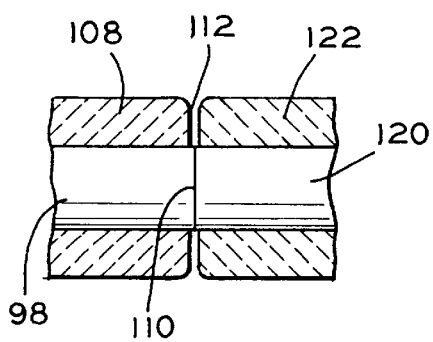
FIG. 16 an enlarged view of the junction of two connectors showing the positioning of the ferrules and the glass fiber.
Figure 17:
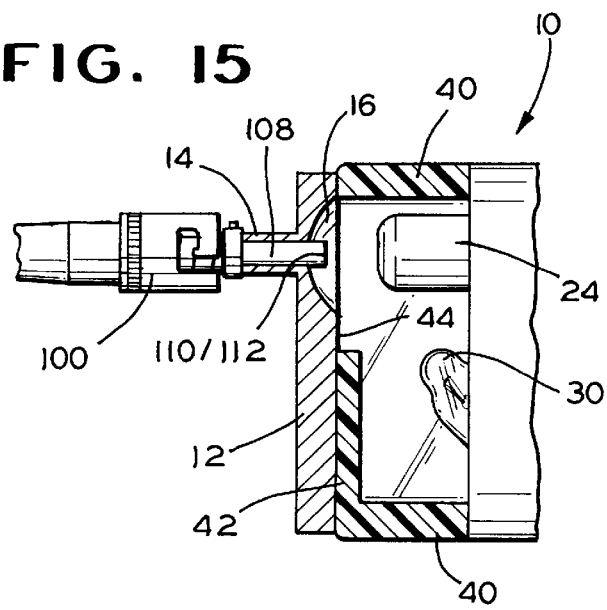
FIG. 17 is a top plan view of end of a ferrule and glass fiber inserted through the end plate into the housing for microscopic inspection of the end surfaces of the glass fiber.

After the fiber optic cable 92 has been stripped, the glass fiber 98 is glued into a connector 100 with an epoxy glue and the end 102 of the connector 100 is crimped about the protective cover 94 of the cable 92. As shown in FIGS. 14–16, the connector 100 includes an aperture 104 for receiving the fiber optic cable 92 such that the glass fiber 98 extends through and just slightly beyond a capillary hole 106 in the ferrule 108. The capillary hole 106 may be sized from 125 to 400 microns depending on the size of fiber optic cable being used.

After the cable 92 is secured in the connector 100, the end of the glass fiber 98 which extends past the end of the ferrule 108 is cleaved and polished using a lapping process. When the lapping process is complete, the clean and polished end surface 110 of the glass fiber 98 is ready to be joined with a corresponding end of another fiber optic system component. The end surface 110 of the glass fiber 98 is generally co-planer with the end surface 112 of the ferrule 108.

The connector 100 shown in FIGS. 14–17 is a standard bayonet type connector. After the fiber optic cable is secured in the connector 100 and the end 110 of the glass fiber 98 is cleaned and polished, the connector 100 is secured in the receptacle 114. FIGS. 14 and 16 show a second connector 116 with fiber optic cable 118 having a glass fiber 120 in ferrule 122. The second connector is secured to the opposite port of the receptacle 114 such that the glass fibers 98, 120 within the ferrules 108, 122 of the two connectors 100, 114 are properly aligned for the efficient transmission of light signals between cable 92 and cable 118. Connectors have been designed with a number of different styles of latching mechanisms and receptacle ports. However, all of the connectors include a ferrule extending from the body of the connector to facilitate the proper alignment and positioning of the glass fiber. The ferrules may be of different diameters, which requires the changing of the adapter in the end plate in order to receive and position the ferrule the glass fiber in the housing of the microscope.

The portable microscope of the present invention is used by a technician to inspect the end surface 110 of the glass fiber 98 of fiber optic cable 92 after it has been secured in the ferrule 108 of connector 100 and after the end surface 110 has been cleaned and polished. The technician needs to ensure that the end surface 110 is not cracked or scratched, and that the end surface 110 is free from dust, lint, or other contaminants.

The ferrule 108 of the connector 100 is inserted through the positioning tube 14 such that the end surface 110 of the glass fiber 98 is positioned within the reflection bowl 16 of the end plate 12. The end surface 110 is aligned with the adjustable focus lens 24 such that the operator can focus the lens 24 on the end surface 110.

The reflective surface on the inner face 44 of the end plate 12 and the shape of the reflection bowl 16 increases the amount of light directed towards the end surface 110 of the glass fiber 98. The additional light on the end surface 110 improves the viewing and detection of a defect or contaminant at the end surface 110 of the glass fiber 98.

In the prior art, the end plates are typically made of dark plastic and do not include a reflective bowl with a reflective surface. When the adjustable focus lens is moved adjacent the end surface to bring it into focus, a portion of the light is blocked by the lens such that the prior art microscopes do not provide the desired amount of light at the end of the glass fiber.

The reflective inner surface 44 of the present invention and the shape of the reflective bowl 16 increases the amount of light from the light source 30 directed towards the end surface 110 of the glass fiber 98. The increase in light is a significant benefit to the technician at a fiber optic system installation using a battery powered portable microscope.

In some cases, defects in, or contaminates on, the end surface 110 of the glass fiber 92 can be more easily detected when the end surface is positioned at a slight angle to the adjustable focus lens 24. The end plate 62 shown in FIGS. 8 and 9 provides such an alignment. The positioning of the glass fiber 92 and ferrule 108 in the end plate 62 also changes the angle of the light reaching the end surface 110 of the glass fiber 92.

Although the body of the microscope 10 and the head unit housing 36 and end plate 12 of the present invention are generally rectangular in shape, the features of the end plate could also be used for circular-shaped portable microscopes.

Figure 18:
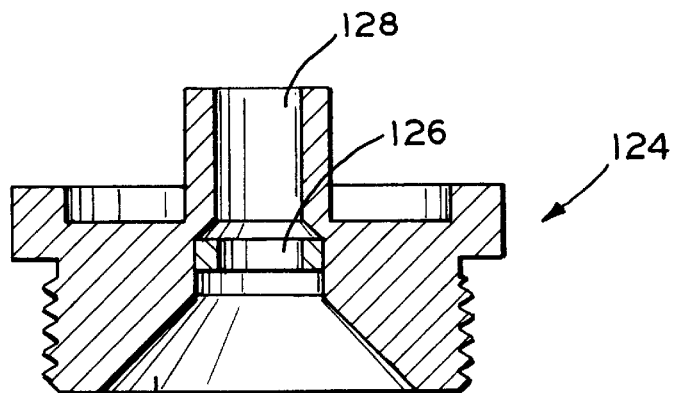
FIG. 18 is a cross sectional view of an adapter with an insert positioned in the ferrule channel.

FIG. 18 shows an alternative adapter 124 for use in end plate 48. The adapter 124 includes a ring-shaped insert 126 positioned at the end of the positioning tube 128 adjacent the reflection bowl 130. The ring-shaped insert 126 provides a soft and flexible surface for gripping and interfacing a ferrule when the ferrule is inserted through the tube 126 into the reflection bowl 130. The positioning tube 126 can be drilled with an internal diameter large enough to accommodate most of the connectors used in the industry. For connectors with a smaller ferrule than some of the alternative connectors, the insert 126 engages the ferrule to secure the ferrule for viewing of the end of the glass fiber (not shown in FIG. 18). The insert 126 is made from a soft and flexible material, such as tygon, which can engage the ferrule without damaging the end of the ferrule as it passes through the insert 126 into the reflection bowl 130.

When a reflection bowl and tubular aperture are integrally formed in an end plate or are formed in a threaded adapter for use in an end plate, such an end plate can provide only one angle for viewing the end surface of the glass fiber. An end plate with an adapter mounted on a sloped surface can provide an angled viewing of the end surface. The sloped surface can slope towards in middle of the end plate (FIGS. 8–9) or towards the outer edge of the end plate, but any such a configuration still provides only an angle view. A flat end plate, such as shown in FIGS. 3–5, can provide only a direct view of the surface end. In order to obtain both a direct view and an angled view of the end surface, a technician would have to change end plates during the middle of an inspection process.

Figures 19, 20:
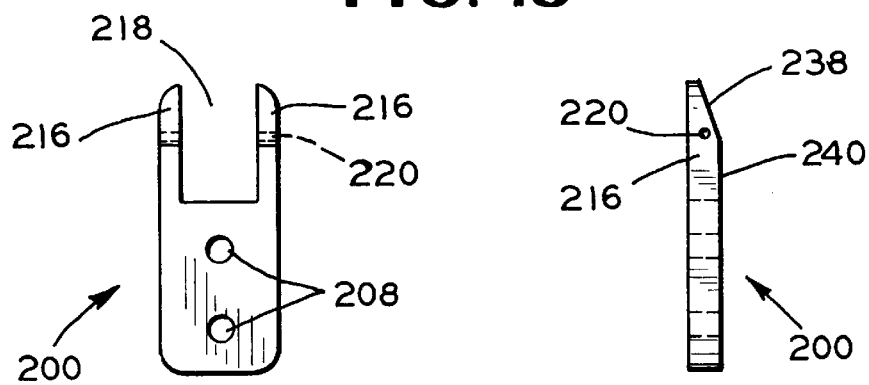
FIG. 19 is a top plan view of an end plate for mounting a rocker head.
FIG. 20 is a side view of the end plate for mounting a rocker head.
Figures 21, 22:
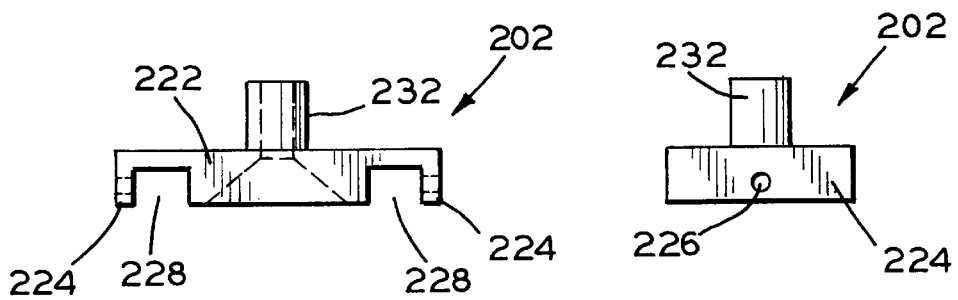
FIG. 21 is a front elevational view of a rocker head with an integrally formed reflection bowl and positioning tube.
FIG. 22 is a side elevational view of the rocker head shown in FIG. 21, including the side apertures for pivotably connecting the rocker head to the end plate shown in FIGS. 19–20.
Figure 23:
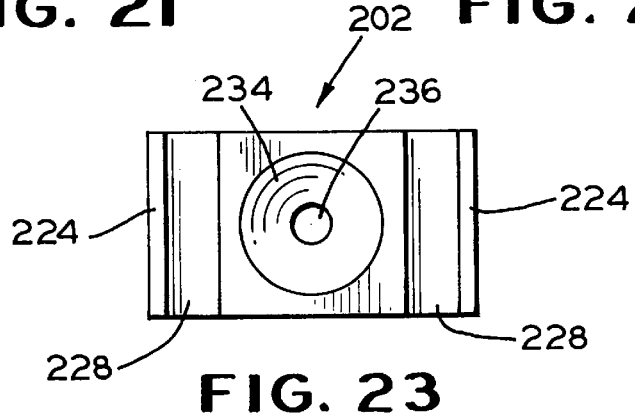
FIG. 23 is a bottom plan view of the rocker head shown in FIG. 21 which shows the mounting slots and reflection bowl.

To overcome this problem, an alternative end plate 200 is shown in FIGS. 19–20 and a rocker head 202 is shown for mounting on the end plate 200. The end plate 200 and rocker head 202 mount on the end of the portable microscope 204 having a head unit housing 206 similar to the housing on microscope 10 shown in FIGS. 1–2. The portable microscope includes a lens 212 and light source 214.

The end plate 200 includes two apertures 208 for insertion of head screws 210 or other fastening means for securing the end plate 200 to the housing 206. The end plate 200 includes two arms 216 and a large aperture 218 formed at the end of the end plate 200 adjacent the lens 212. The end plate 200 includes an aperture 220 in each arm 216 for securing the rocker head 202 in the aperture 218.

The rocker head 202 includes a base 222 with flanges 224 formed along the outer edges. The flanges 224 are provided with an aperture 226 and form a retention slot 228 for securing the rocker head 202 to the end plate 200. The rocker head 202 is secured to the end plate 202 by fastening means 230. The rocker head 202 includes a positioning tube 232 and reflection bowl 234 formed within the rocker head 202. A center aperture 236 is provided for receiving a ferrule and positioning the end of a glass fiber for inspection. The reflection bowl 234 provides the viewing benefits described above.

The arms 216 of the end plate 200 have an initial flat surface when extending from the body of the end plate 200. The outer end of the arms 216 is provided with a sloped surface 238 to facilitate the pivoting of the rocker head 202 on the end plate 200. The retention slots 228 of the rocker head 202 are positioned over the arms 216 of the end plate 200 and the apertures 220 are aligned with the apertures 226 for insertion of fastening means 230.

Figure 24:
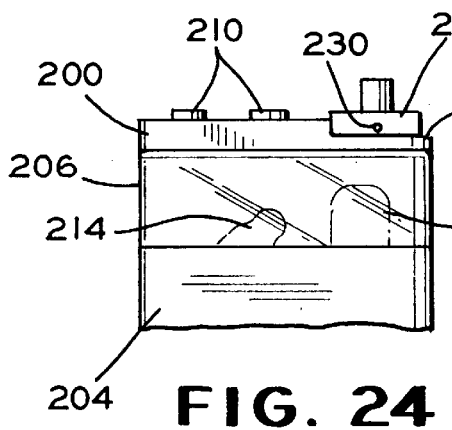
FIG. 24 shows the end plate and rocker head of FIGS. 19–23 mounted at the end of the microscope with the rocker head positioned for direct viewing of the end surface of a glass fiber.
Figure 25:
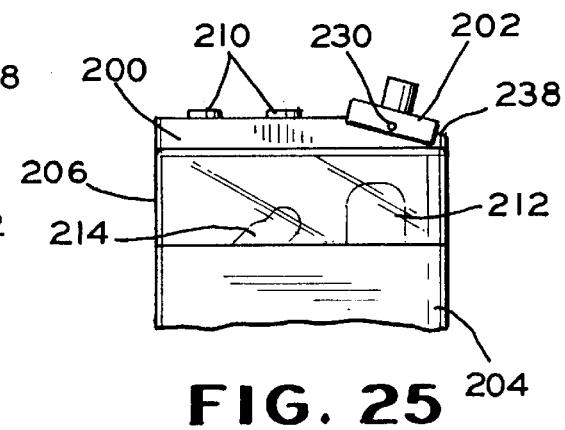
FIG. 25 shows the end of end plate and rocker head of FIG. 24 with the rocker head pivoted for viewing the surface end of a glass fiber at an angle.

When the end plate 200 and rocker head 202 are mounted on the housing 206, the rocker head 202 can be maintained in a horizontal position as shown in FIG. 24 for direct viewing of the surface end of a glass fiber. The rocker head 202 can be pivoted to an angled position as shown in FIG. 25 for viewing the surface end of a glass fiber at an angle. The technician using the microscope 204 can quickly and easily obtain a direct view and angled view in a single inspection. When the rocker head 202 is in the horizontal position as shown in FIG. 24, the segment of each retention slot 228 adjacent the screws 210 engages the flat surface 240 of the corresponding arm 216. The rocker head 202 may be pivoted at an angle until the outer segments of the retention slots 228 of the rocker head 202 engage the sloped surface 238 of the arms 216. The slope of the surface 238 determines the maximum angle at which the rocker head 202 can be positioned.

When the rocker head 202 is at an angled position as shown in FIG. 25, the reflection bowl 234 is aimed directly at the light source 214. The angled position of the rocker head 202 and the reflection bowl construction provide improved lighting at the surface end of a glass fiber positioned in the reflection bowl 234, which improves the inspection capabilities of the microscope 204. The preferred range for the viewing angle when inspecting the surface end of the glass fiber is in the range between 15–30 degrees, with 22 degrees being preferred angle.

Figure 26:
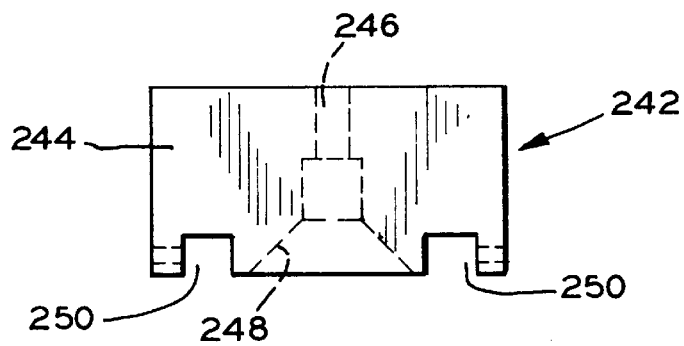
FIG. 26 is a front elevational view of an alternative rocker head for mounting on the end plate.

FIG. 26 shows an alternative rocker head 242 with a thicker body 244. The center aperture 246 for receiving a ferrule and positioning the surface end of a fiber cable is formed within the body 244. A reflection bowl 248 is formed on the inner surface of the rocker head 242. The rocker head 242 includes retention slots 250 and is mounted on the same end plate 200. The rocker head 242 can be pivoted between a horizontal and an angled position on the end plate 200 of the microscope 204.

An alternative embodiment for a microscope end plate with a reflection bowl in a pivoting rocker head is shown in FIGS. 27–33. The portable microscope 300 in FIG. 27 includes a lens 302 and light source 304 at one end. In some portable microscopes, typically 200× magnification and greater, an alternative spacer or housing will be needed to achieve the desired positioning and lighting for inspection of the surface end of a glass fiber. The housing and spacer configuration can be open or enclosed. The housing and/or spacer can be fixed or detachable. In addition to the basic requirement of properly positioning the end plate for locating the end surface of the glass fiber for viewing through the lens, the housing and/or spacer should also direct as much light as possible towards the surface end of the glass fiber for improved inspection capabilities.

Figure 27:
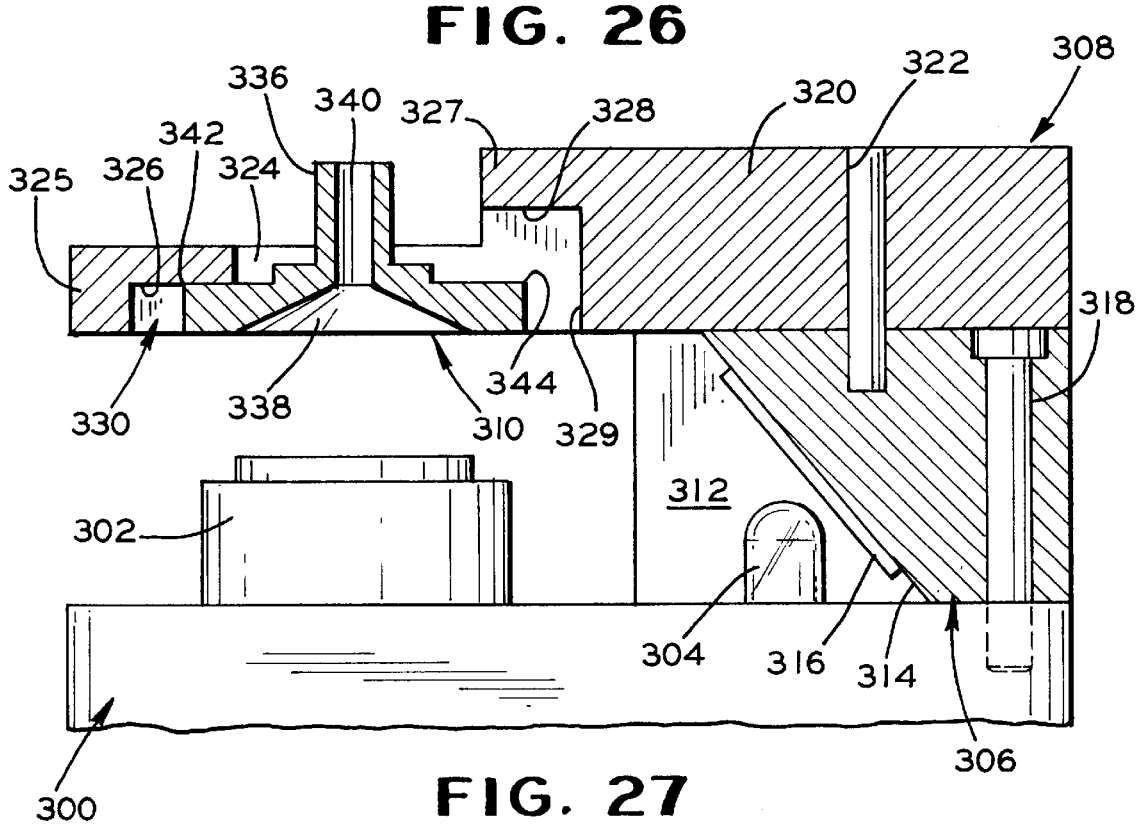
FIG. 27 is a cross sectional view of a U-shaped head for a portable microscope which includes a base with an angled surface for reflecting light, an end plate for mounting a rocker head, and a rocker head with an integrally formed reflection bowl for positioning a surface end of a glass fiber for viewing, the rocker head shown in the position for direct viewing of the surface end.

The embodiment in FIG. 27 includes a spacer block 306 with end plate 308 and rocker head 310 mounted adjacent to the lens 302 and light source 304. The spacer block 306 in FIGS. 27–28 is not a full rectangular block because the spacer block has a segment of the block removed. An aluminum block or other metal block can be machined to form two side walls 312 and an angled surface 314 within the two side walls 312. The spacer block 306 is mounted on the microscope 300 adjacent the light source 304. The angled surface 314 can be any angle, but generally a slope of approximately 45 degrees will be used. A reflective insert 316 may be formed on or attached to the angled surface 314. The angled surface 314 and reflective insert 316 direct the light from the light source 304 to a glass fiber positioned in the rocker head 310. The spacer block includes one or more tubular apertures 318 for insertion of a fastening means (not shown) to fasten the spacer block 306 to the body of the microscope 300.

The features of the end plate 308 and the positioning of the rocker head 310 on the end plate are shown in FIG. 27 and FIGS. 29-33. The body 320 of the end plate 308 includes one or more tubular apertures 322 for securing the end plate 308 to the body of the spacer block 306.

As shown in FIG. 27 and the bottom plan view of FIG. 29, the end plate 308 includes two arms 324 extending horizontally from the body 320. An outer cross segment 325 having an outer retention surface 326 and an inner cross segment 327 having an inner retention surface 328 extend across the arms 324 to form a cavity 330 in which the rocker head 310 is mounted. The inner cross segment 327 is integrally formed in the body 320 of the end plate 308 and extends from the wall 329, which forms part of the cavity 330. The outer retention surface 326 and the inner retention surface 328 are offset to facilitate the pivoting of the rocker head 310. The arms 324 each have an aperture 332, and fastening means 334 extend through the apertures into the rocker head 310 to pivotably secure the rocker head 310.

The rocker head 310 includes a positioning tube 336 and reflection bowl 338 with a center aperture 340. The rocker head 310 is pivotably connected to the arms 324 of the end plate 308.

For direct viewing of the end surface of a glass fiber, the rocker head 310 is positioned in the horizontal position as shown in FIG. 27. The outer edge 342 of the rocker head 310 engages the outer retention surface 326 to stabilize the rocker head 310. The rocker head 310 can be pivoted to an angled position, with the maximum angle determined by the offset of the inner retention surface 328 from the outer retention surface 326. When the inner edge 344 of the rocker head 310 engages the inner retention surface 328, the rocker head 310 cannot be pivoted an further. The preferred range of angles for an angled view of the surface end of a glass fiber is between 15 and 30 degrees, with 22 degrees being the most preferred angle.

The embodiment shown in FIGS. 27–33 has several features which individually and collectively improve the inspection capabilities of the portable microscope 300. The spacer block 306 includes an angled surface 314 for directing more light towards the surface end of the glass fiber positioned in the reflection bowl 338 of the rocker head 310. The reflection bowl 338 of the rocker head 310 reflects the light about the surface end of the glass fiber. The rocker head 310 is pivotable to facilitate both the direct viewing and the angled viewing of the surface end of the glass fiber.

When a technician is using the portable microscope in the field, it is helpful in detecting defects to have both a direct view of the end surface of the glass fiber of a fiber optic cable and an angled view of the end surface. For a direct view, the viewing line of the lens is perpendicular to the end surface of the glass fiber. For an angled view of the end surface, the lens is positioned at a non-perpendicular angle to the end surface. As noted above, the angled view is generally at an offset angle of between 15–30 degrees from the direct view position. Obtaining an angled view of the end surface of a glass fiber in the field was difficult and required special equipment and/or a separate microscope. The rocker head adapters of the present invention greatly simplify the process for obtaining a direct view and an end view of a surface end of a glass fiber. The glass fiber is inserted in the tubular aperture of a rocker head and the lens is focused to view the surface end. Typically, a direct view inspection is conducted first and an angled view is conducted second, but this order could be reversed. Once the technician has viewed the end surface and completed the first inspection (direct view), the rocker head is pivoted and the second inspection (angled view) is completed. Assuming that no defects were found in the surface end, the glass fiber is then removed from the rocker head and is ready for installation.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A portable microscope for inspecting a glass fiber of a fiber optic cable secured in a ferrule of a fiber optic connector, said microscope comprising:

an elongate enclosure having a magnifying channel with a head end and a viewing end;

a housing formed at the head end of said enclosure, said housing including an aperture for receiving a glass fiber in a ferrule;

a magnifying system mounted in the magnifying channel of said enclosure, said magnifying system including an adjustable focus lens positioned in said housing;

a battery powered light source mounted in said enclosure, said light source directing light into said housing;

an end plate secured to said housing to cover the aperture in said housing, said end plate including an aperture aligned with the housing aperture adjacent the adjustable focus lens;

an adapter secured in the aperture of said end plate, said adapter including a tubular aperture extending through said adapter for receiving and positioning the glass fiber adjacent the adjustable focus lens; and a ring-shaped insert positioned in said tubular aperture for engaging the glass fiber in the tubular aperture.

2. The portable microscope defined in claim 1 wherein said ring-shaped insert is made from tygon.

3. The portable microscope defined in claim 1 wherein said adapter includes an integral concave reflection bowl formed on an inner surface of said adapter about the tubular aperture.

4. A portable microscope for inspecting a glass fiber of a fiber optic cable secured in a ferrule of a fiber optic connector, said microscope comprising:

an elongate enclosure having a magnifying channel with a head end and a viewing end;

a housing formed at the head end of said enclosure, said housing including an aperture for receiving a glass fiber in a ferrule;

a magnifying system mounted in the magnifying channel of said enclosure, said magnifying system including an adjustable focus lens positioned in said housing;

a battery powered light source mounted in said enclosure, said light source directing light into said housing;

an end plate secured to said housing to cover the aperture in said housing, said end plate including a sloped segment formed in an outer surface of said end plate and an aperture formed in the sloped segment such that the aperture is aligned with the housing aperture and is adjacent the adjustable focus lens; and an adapter secured in the aperture in the sloped segment of said end plate, said adapter including a tubular aperture extending through said adapter for receiving and positioning the glass fiber adjacent the adjustable focus lens, and including an integral concave reflection bowl formed on an inner surface of said adapter about the tubular aperture.

5. A portable microscope for inspecting a glass fiber of a fiber optic cable secured in a ferrule of a fiber optic connector, said microscope comprising:

an elongate enclosure having a magnifying channel with a head end and a viewing end;

a housing formed at the head end of said enclosure, said housing including an aperture for receiving a glass fiber in a ferrule;

a magnifying system mounted in the magnifying channel of said enclosure, said magnifying system including an adjustable focus lens positioned in said housing;

a battery powered light source mounted in said enclosure, said light source directing light into said housing;

an end plate secured to said housing to cover the aperture in said housing, said end plate including an aperture aligned with the housing aperture adjacent the adjustable focus lens; and a rocker head adapter pivotably connected to said end plate and positioned in the aperture of said end plate, said rocker head adapter including a tubular aperture extending through said adapter for receiving and positioning the glass fiber adjacent the adjustable focus lens whereby the rocker may be pivoted to change the angle at which an end surface of the glass fiber is viewed through the lens.

6. The portable microscope defined in claim 5 wherein said rocker head adapter includes an integral concave reflection bowl formed on an inner surface of said adapter about the tubular aperture.

7. The portable microscope defined in claim 5 wherein said rocker head adapter is positioned on the end plate for direct viewing such that the end surface of the glass fiber is aligned perpendicular to the lens for direct viewing of the end surface of the glass fiber, and wherein said rocker head can be pivoted up to approximately thirty degrees for viewing the end surface of the glass fiber at an angle.

8. The portable microscope defined in claim 7 wherein said rocker head adapter is pivotable from a direct viewing position through approximately twenty-two degrees for angled viewing of the end surface of the glass fiber.

9. The portable microscope defined in claim 5 wherein said end plate includes a pair of spaced-apart mounting arms at one end of the end plate which form the aperture in the end plate, and said rocker head adapter includes corresponding mounting slots which are positioned about the mounting arms of said base plate.

10. The portable microscope defined in claim 9 wherein the mounting arms of said end plate include a horizontal segment and a sloped segment to facilitate the pivoting of the rocker head adapter.

11. A portable microscope for inspecting a glass fiber of a fiber optic cable secured in a ferrule of a fiber optic connector, said microscope comprising:

an elongate enclosure having a magnifying channel with a head end and a viewing end;

a magnifying system mounted in the magnifying channel of said enclosure, said magnifying system including an adjustable focus lens positioned at the head end of said enclosure;

a battery powered light source positioned at the head end of said enclosure, said light source emitting light adjacent the lens;

a spacer block connected to the head end of said enclosure, said spacer block being positioned adjacent said light source and including a reflective surface for reflecting light received from said light source; and an end plate secured to said spacer block and extending from said spacer block to a position adjacent the lens, said end plate including a tubular aperture for receiving and positioning the glass fiber adjacent the lens, whereby light from the light source and from the reflective surface of said spacer block are directed towards the glass fiber when viewing the glass fiber through the lens.

12. The portable microscope defined in claim 11, wherein said end plate includes a reflection bowl formed in an inner surface of said end plate about the tubular aperture.

13. The portable microscope defined in claim 11, wherein said end plate includes a rocker head adapter pivotably connected to mounting arms of said end plate and the tubular aperture for said end plate is formed through said rocker head adapter, whereby the rocker head adapter may be pivoted to view an end surface of the glass fiber at various angles.

14. The portable microscope defined in claim 13, wherein the rocker head pivotably connected to said end plate includes a reflection bowl formed in an inner surface of said end plate about the tubular aperture.

15. The portable microscope defined in claim 13, wherein said rocker head adapter is positioned on the end plate for direct viewing such that the end surface of the glass fiber is aligned perpendicular to the lens for direct viewing of the end surface of the glass fiber, and wherein said rocker head can be pivoted up to approximately thirty degrees for viewing the end surface of the glass fiber at an angle.

16. The portable microscope defined in claim 13 wherein said end plate includes two retention stops formed in said end plate selectively engaging said rocker head adapter to limit the pivoting action of said rocker head adapter.

17. The portable microscope defined in claim 13 wherein said retention stops are formed on opposite side of said rocker head and are offset to limit the pivoting of said rocker head to approximately a thirty degree angle.

18. A method for inspecting a surface end of a glass fiber of a fiber optic cable in a fiber optic connector using a portable microscope having a end plate with a pivotable rocker head and a tubular aperture extending through the rocker head for positioning the surface end adjacent a lens for viewing, said method comprising the steps of:

positioning the glass fiber of the fiber optic cable in the tubular aperture for direct viewing such that the lens of the microscope is aligned perpendicular to the surface end of the fiber optic cable;

focusing the lens of the microscope on the surface end of the glass fiber for direct inspection of the end surface;

pivoting the rocker head of the end plate of the microscope for angled viewing such that the lens of the microscope is aligned at a non-perpendicular angle to the surface end;

adjusting the focus on the lens of the microscope for angled inspection of the end surface; and removing the glass fiber of the fiber optic cable from the tubular aperture of the rocker head.

\* \* \* \* \*